June 8, 1965  O. W. SEPP, JR  3,188,027
PARACHUTE DEPLOYMENT BAG
Filed Oct. 26, 1962  9 Sheets-Sheet 1

INVENTOR.
OSCAR W. SEPP, JR.
BY
Burgess, Ryan & Hicks
ATTORNEYS

June 8, 1965 O. W. SEPP, JR 3,188,027
PARACHUTE DEPLOYMENT BAG
Filed Oct. 26, 1962 9 Sheets-Sheet 3

INVENTOR.
OSCAR W. SEPP, JR.
BY
Burgess, Ryan & Hicks
ATTORNEYS

INVENTOR.
OSCAR W. SEPP, JR.
ATTORNEYS

INVENTOR.
OSCAR W. SEPP, JR.
ATTORNEYS

United States Patent Office 3,188,027
Patented June 8, 1965

3,188,027
PARACHUTE DEPLOYMENT BAG
Oscar W. Sepp, Jr., Merrick, N.Y., assignor to M. Steinthal & Co., Inc., New York, N.Y., a corporation of New York
Filed Oct. 26, 1962, Ser. No. 233,232
4 Claims. (Cl. 244—147)

The present invention relates to a parachute deployment bag especially useful in connection with the braking of a high speed aircraft, as for example, a rocket jet aircraft upon landing.

In the usual drag chute deployment system for braking an aircraft upon landing, a pilot chute is first ejected from a compartment in the tail section or empenage of the aircraft where the deployment bag from the main drag parachute is housed, and the deployed pilot chute pulls out the deployment bag from the compartment, so that the main drag parachute is deployed from the bag while the bag is being dragged behind the aircraft and is being tossed about violently in the slip stream behind the aircraft. Under these conditions, the deployment bag is subjected to destructive actions which give it a short life, and the violent movements of the bag tend to disrupt the orderly deployment of the main parachute therefrom.

One object of the present invention is to provide a new and improved deployment bag designed to be retained in the tail section or empenage of the aircraft while the main drag parachute is being deployed therefrom.

Another object of the present invention is to provide a new and improved system of deployment in which the bag is anchored to the aircraft while the main parachute is being deployed therefrom.

Other objects of the invention are apparent from the following description and from the accompanying drawings, in which

FIG. 15 is a perspective of the fully extended deployment bag shown after the canopy of the main drag parachute has been fully stowed inside the bag, and after the closure flaps of the bag have been loop-laced together into closed position;

Referring to the drawings, the deployment bag of the present invention is shown in connection with a high speed aircraft 10 (FIGS. 1–4), as for example, one of the rocket jet type, which upon landing on a runway is moving at a great speed, and which must be slowed down by means of a drag parachute. The tail or empenage 11 of the aircraft 10 has built into it a stowage chamber 12 having a door 13 for a doorway 14. The door 13 is hinged at its forward end to the fuselage of the aircraft about an axis C (FIG. 4) transverse to the longitudinal direction of the aircraft, and when the door is closed, it follows the general contour of the tail of the aircraft. The hinge connection for the door 13 may be of any suitable form, and is specifically shown of the type illustrated in my copending application Serial No. 214,250, filed August 2, 1962.

Figure 1:
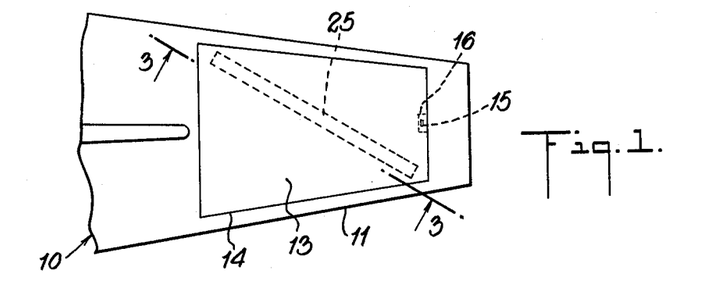
FIG. 1 is the top plan diagrammatic view of the tail or empenage of an aircraft containing the stowage chamber in which the deployment bag of the present invention is housed and shown with the door of the compartment closed.
Figure 2:
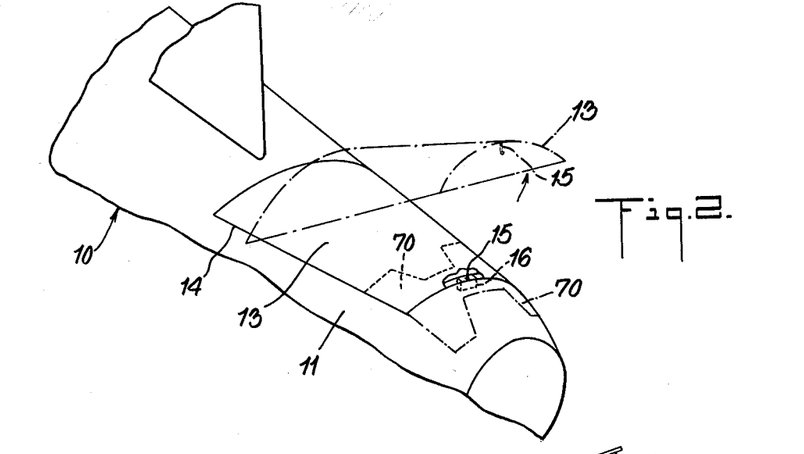
FIG. 2 is a diagrammatic perspective of part of the tail or empenage of the aircraft and in full lines shows the door to the aircraft stowage chamber closed and in dot and dash lines shows the door in fully open position.
Figure 4:
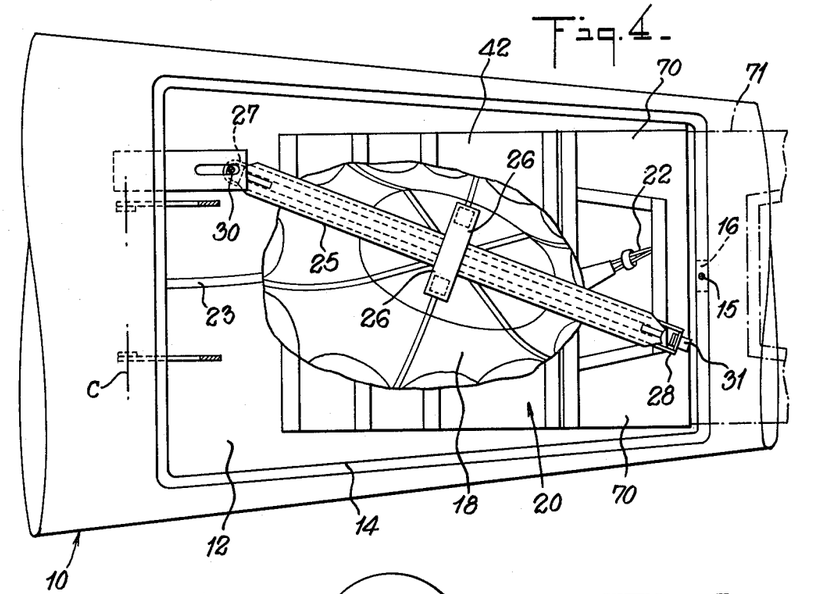
FIG. 4 is a section of the deployment compartment and of the pilot chute ejection device taken approximately along the lines 4—4 of FIG. 3.

The door 13 is unlatched and actuated into open position either by spring means or by hydraulic means (not shown) well known in the art. In FIGS. 1 and 4 of the drawings, the latch connection is shown diagrammatically comprising a hook device 15 on the outer end of the door 13 and a catch device 16 on the section of the fuselage of the aircraft framing the aft end of the door opening 14.

Figure 5:
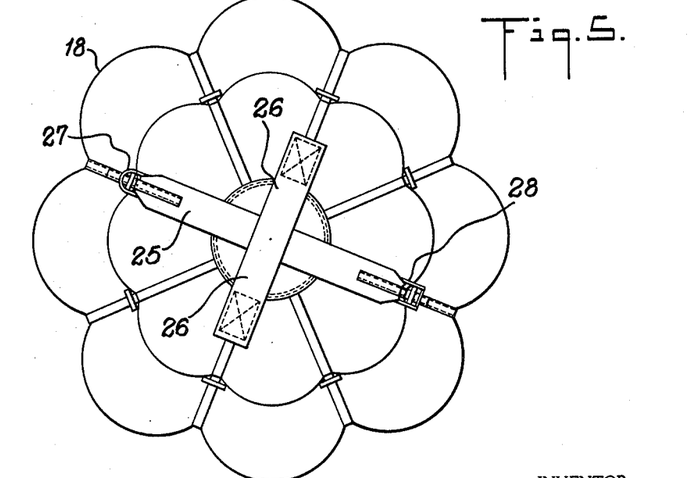
FIG. 5 is a top plan view of the inflated pilot chute canopy which may be employed in conjunction with the deployment bag of the present invention.
Figure 6:
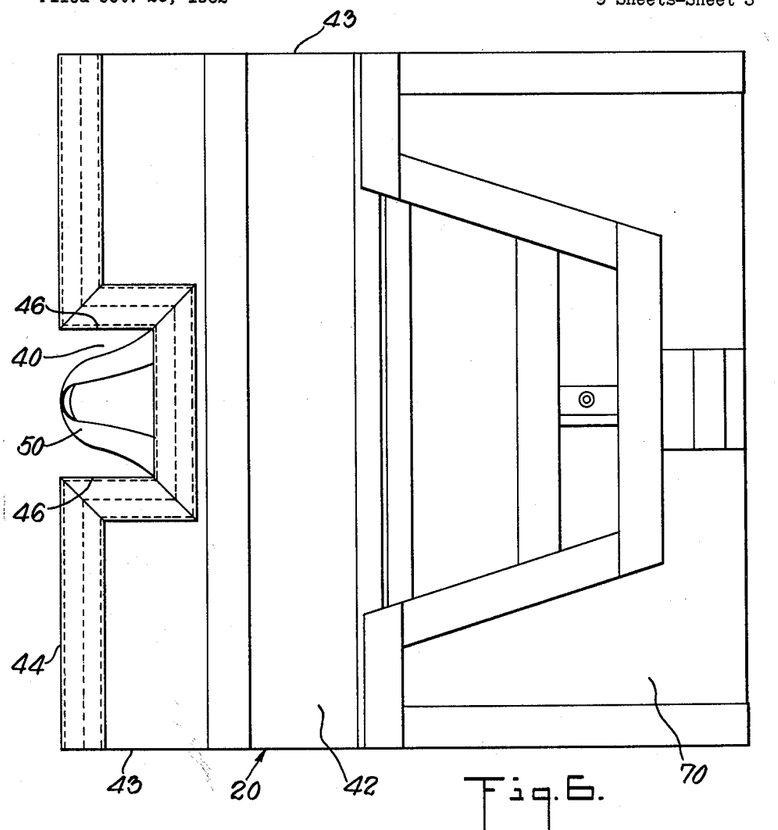
FIG. 6 is a top plan view of the deployment bag embodying the present invention.
Figure 7:
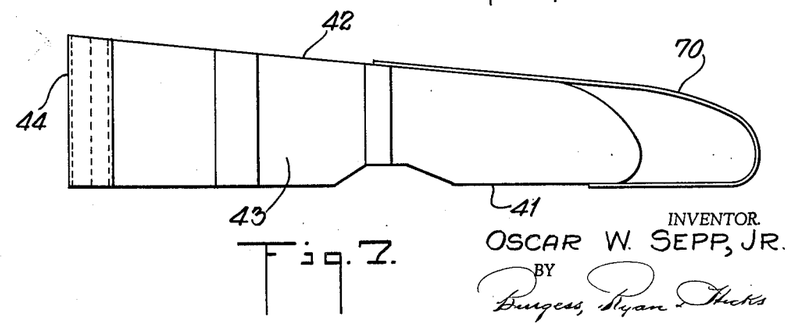
FIG. 7 is a side elevation of the deployment bag embodying the present invention.

Stowed inside the chamber 12 is a pilot chute 18 (FIGS. 3, 4 and 5) and a deployment bag 20 in which the main drag parachute 21 (FIG. 14) is stowed. The bridle or lanyard 22 (FIGS. 3, 4, 14 and 15) connecting the suspension lines of the pilot chute 18 and the apex or vent region of the main parachute 21, extends through the aft end of the deployment bag 20, while the riser 23 of the main parachute extends out through the other forward end of the deployment bag and is anchored at 24 (FIG. 3) to the body of the aircraft 10.

The pilot chute 18, per se, forms no part of the present invention, and is shown for purposes of illustration of the type disclosed in the U.S. Patent 2,974,913. Extending across the top of the canopy of the pilot chute 18 is an ejection spring device 25 (FIGS. 1, 3, 4 and 5) in the form of an elastic strap tied to the canopy of the pilot chute by means of slack lanyards 26 and having clasps or buckles 27 and 28 at its opposite ends, as shown and covered in the aforesaid copending application. The door 13 has two catches 30 and 31 on its inside for releasable latch engagement with the clasps 27 and 28 respectively of the spring device 25 in extended tensioned condition of the spring device. These catches 30 and 31 are located along a line somewhat diagonally of the door, to extend the spring device in a similar diagonal direction, as shown in FIGS. 1 and 4, so that the pilot chute 18 is ejected not in the turbulent region of the slip stream just behind the aircraft but in the side regions of the streams where the flow is more laminar, and where the opening of the ejected pilot chute is effected more quickly and orderly.

Figure 3:
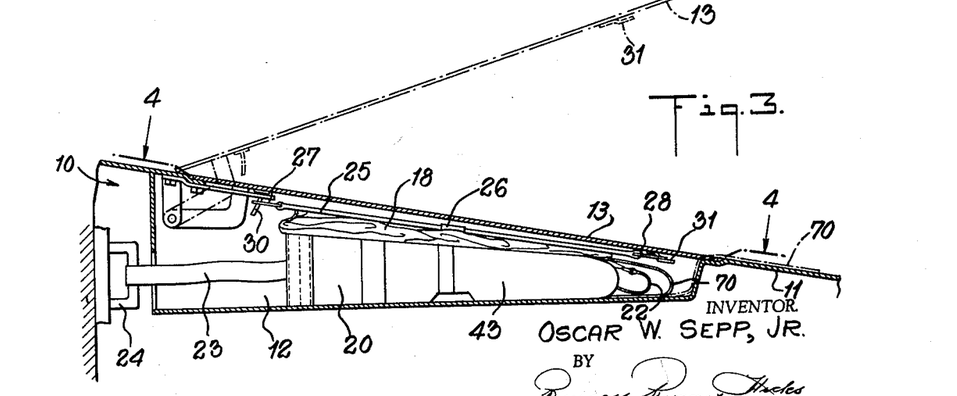
FIG. 3 is a section of the aircraft along the aircraft stowage chamber taken approximately along the lines 3—3 of FIG. 1 and showing housed in said chamber the packed deployment bag embodying the present invention and also the pilot chute.

The pilot chute 18 with the spring device 25 attached thereto and the deployment bag 20 containing the drag parachute 21 are stowed together in the aircraft stowage chamber 12 in loaded ready state shown in FIGS. 1, 3 and 4 with the extended tensioned spring device 25 latched onto the catches 30 ad 31 and the door 13 closed. At the instant the aircraft 10 is landing at high speed on a runway, the door 13 to the aircraft stowage chamber 12 is latched in closed position, as shown in FIGS. 1, 3 and 4. The pilot at that instant, releases by remote control the latch connection 15, 16 and permits the door 13 under spring or hydraulic action to swing open quickly about the hinge axis C, as shown in dot and dash lines in FIG. 2. As the door 13 swings open, the catch 30 on the door pulls out of engagement with the clasp 27. As soon as the catch 30 clears the clasp 27, the highly tensioned spring device 25 will be released and will recoil in a diagonal aft direction towards the catch 28, causing said spring device to become disengaged from said catch 28 and the spring device to be propelled at high speed from the chamber 12 through the exitway between the open door 13 and the chamber 12. The propelled spring device 25 will carry the pilot chute 18 with it out of the aircraft stowage chamber 12 and clear of the aircraft into the side of the slip stream of the aircraft, thereby causing the pilot chute to open up. The inflated pilot chute 18 will pull the main parachute 21 out of the deployment bag 20, while the bag remains in the aircraft stowage chamber 12. Since the riser 23 of the main parachute 21 is anchored to the aircraft at 24, the parachute upon being inflated, will exercise a braking influence on the aircraft, while the pilot chute 18 collapses, thereby limiting the landing run of the aircraft to a safe distance.

The pilot chute ejection system has been described here only briefly and just sufficiently to lay a background for the description of the deployment bag 20 hereinafter, which is the subject of the present invention. The pilot chute ejection system is fully described in the aforesaid copending application.

The deployment bag 20 is designed to be held in the aircraft stowage chamber 12 of the aircraft 10, while the drag parachute 21 is being deployed therefrom. The deployment bag 20 is shown in fully extended condition in FIGS. 6, 7, 18 and 19, and in this condition, is generally flat and generally rectangular in outline, except for a channel 40 at the forward end of the bag, as will be described more fully, and is low in height compared with its length and width. The deployment bag 20 comprises a bottom face panel 41, a top face panel 42, side panels 43, and a forward end panel 44, these panels conjointly defining a stowage compartment 45, and said bag being openable at its aft end to afford access to the interior of said compartment. The panels 41, 42, 43 and 44 are made of strong flexible fabric material, and are reinforced at different critical sections with webbing and/or stiffeners of strong material, but not sufficiently to prevent the bag 20 from being reversely turned partially inside out, for the purpose to be described.

Figure 8:
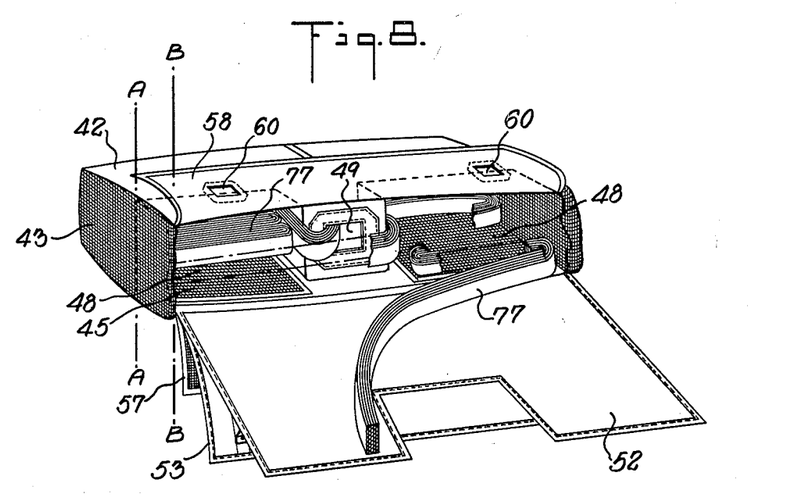
FIG. 8 shows a perspective of the deployment bag reversely folded partially back in the initial stages of being packed while the risers of the main parachute are being stowed therein.
Figure 18:
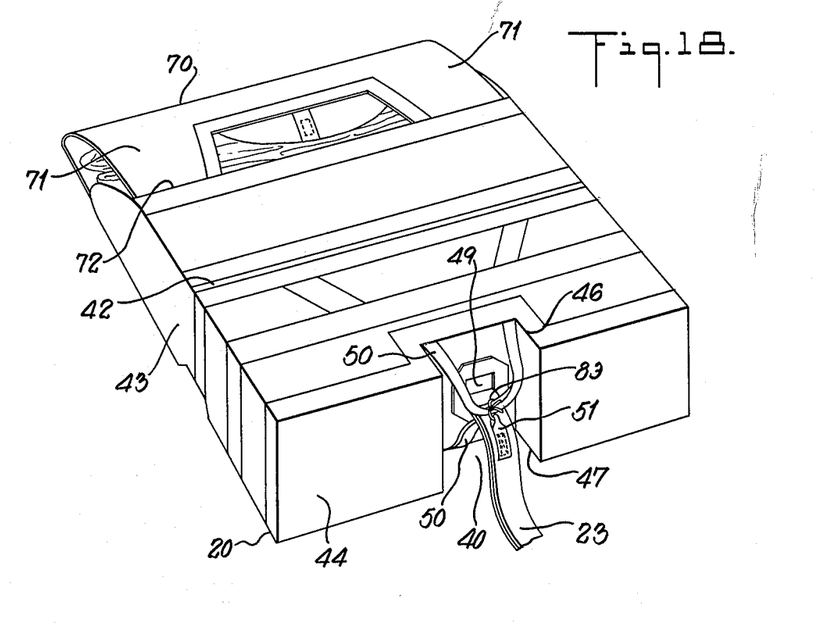
FIG. 18 is a perspective of the fully extended fully packed deployment bag and shows particularly the forward end of the bag where the riser of the main parachute passes through an opening in the end wall of the bag for connection to an anchor point on the aircraft.
Figure 19:
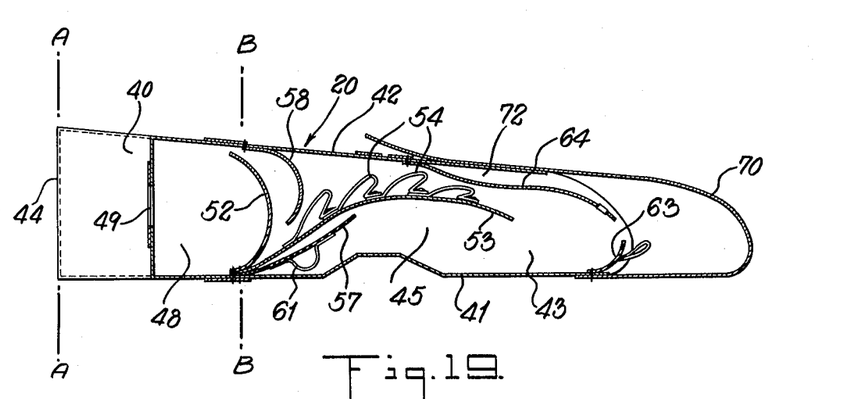
FIG. 19 is a longitudinal section of the empty deployment bag fully extended.

The face panels 41 and 42 at their forward ends have respective central recesses 46 and 47 and the forward end panel 44 following the forward end contours of these face panels, serves to form the channel 40 in the forward end of the deployment bag 20 and to partition the end section of the stowage compartment 45 into two adjoining riser stowage spaces 48 (FIGS. 8 and 19). The end panel 44 has a hole 49 (FIGS. 18 and 19) at the base of the channel 40, through which the riser 23 of the main parachute 21 emerges from the deployment bag 20.

Connected to the bottom and top panels 41 and 42 are bridles 50 in the form of handles or loops adapted to be secured to riser tabs 51 in the form of loops on the riser 23 of the parachute 21 emerging from the deployment bag 20 through the hole 50 to restrain the deployment bag 20 from being pulled out of the chamber 12 during parachute deployment, as will be more fully described. The channel 40 at the end of the deployment bag 20 defines a hollow into which the bridles 50 are at least partially housed, so that these bridles with their attachments to the bridles do not project substantially beyond the general rectangular contour of the bag, thereby lending compactness to the packed bag and protecting the attachments against interference during stowage and deployment.

Connected to the bottom panel 41 of the deployment bag 20 is a riser stowage protector flap 52 (FIGS. 8, 9, 10 and 19). Also connected to the bottom panel 41 of the deployment bag 20 is the suspension line stowage flap 53 (FIGS. 8, 9, 10, 11 and 19) in the form of a tray having secured to the upper face thereof two series of suspension line retaining loop straps 54 (FIGS. 10 and 19), each strap in each row being anchored at one end to a snap fastener element 55 and carrying at the other end a snap fastener element 56 for snap engagement with the fastener anchoring element 55 of the next loop in that row, said snap fasteners 55 and 56 being of the usual male and female type of snap fasteners. The straps 54 in this releasable form ease the stowing of the suspension lines on the stowage flap 53.

Secured to the bottom bag panel 41 is a flap 57 (FIGS. 8–13) and secured to the top bag panel 42 is a flap 58, these flaps cooperating to serve as compartment locking flaps to lock the suspension lines stowed on the tray 53 in the stowage compartment 45. For that purpose, one of these flaps, as for example, the upper flap 58 has two holes 60, substantially rectangular in shape and spaced across the width of the flap, while the other flap 57 carries two loops 61 of webbing, correspondingly located to pass through these holes respectively when the two locking flaps are folded across the stowage compartment 45 in overlapping relationship. The portions of the loops 61 on the flap 57 projecting beyond the holes 60 on the other flap 58 serve to hold some of the folds of the suspension lines nearest the skirt of the canopy of the parachute 21.

Secured to the bottom panel 41 is an anchorage strip or short flap 63 (FIGS. 14, 15, 16 and 19) for two closure flaps 64 and 65 extending across the full width of said panel and having a series of loops 66 spaced therealong. Secured to the top bag panel 42 and to the side bag panels 43 are two closure flaps 64 and 65, long enough to extend outwardly beyond the aft edge of the top bag panel and across the end of the stowage compartment 45 from top to bottom to the anchorage strip 63 and extending side by side in overlapping marginal relationship at their inner confronting sides when the flaps are loop-laced to the anchorage strip 63, as will be described. Along the end margin of each closure flap 64 and 65 are a series of eyelets 67 in the form of grommets located opposite the loops 66 respectively on the anchorage strip 63 to permit the loops to pass easily through the grommets 66 respectively in the loop-lacing of the closure flaps 64 and 65 to the anchorage strip 63. The inner side margin of the closure flap 64 carries a series of loops 68 spaced therealong and the inner side margin of the other closure flap 65 has a series of spaced eyelets 69 in the form of grommets located opposite the loops to permit the loops to pass easily through the grommets respectively in the loop-lacing of the overlapping inner sides of the closure flaps 64 and 65 together. The loop-lacing of the closure flaps 64 and 65 together is accomplished after the canopy of the main parachute 21 is stowed in the compartment 45 of the bag in the manner to be described.

Secured to the aft end of the bottom bag panel 41 is a flap 70 adapted to be folded temporarily over the pilot chute 18 after the bag 20 has been packed and before the packed bag has been set up in the stowage chamber 12 of the aircraft 10. This flap 70 is automatically pulled out by deployment action as shown in dot and dash lines in FIGS. 2 and 3, to overlie and cover aft edge of the fuselage framing the doorway and the latch element 16 on the aircraft and serves thereby as a blanket to prevent the parachute 21 being deployed from catching onto said edge or latch element. The flap 70 is U-shape to define two legs 71 and between the top bag panel 42 and the closure flaps 64 and 65 is formed a pocket 72 (FIGS. 17, 18 and 19) to receive these legs in folded pilot chute stowing position of the flap.

The parachute system to be stowed comprises the main parachute 21 having a canopy 74, and suspension lines 75 (FIGS. 9, 10, 11, 12 and 13) connected by connector links 76 (FIG. 9) to riser legs 77 (FIGS. 8 and 9), which in turn are connected to the riser 23 (FIGS. 3, 4 and 18). The pilot chute 18 is connected to the bridle or lanyard 22 which in turn is connected to the apex region of the main parachute 21.

In the packing of the parachutes 21 and 18 in the deployment bag 20, the riser 23 is inserted into the empty deployment bag 20 and passed through the hole 49 in the end wall 44, and the bag is slid up the riser to a point just back of the riser tabs 51. The bridles 50 on the deployment bag 20 are secured to the riser tabs 51 by strong cord or webbing 83 (FIG. 18) to form a strong attachment between the riser and the deployment bag, serving to hold the bag in the aircraft stowage chamber 12 of the aircraft, while the main parachute 21 is being deployed therefrom.

Figure 14:
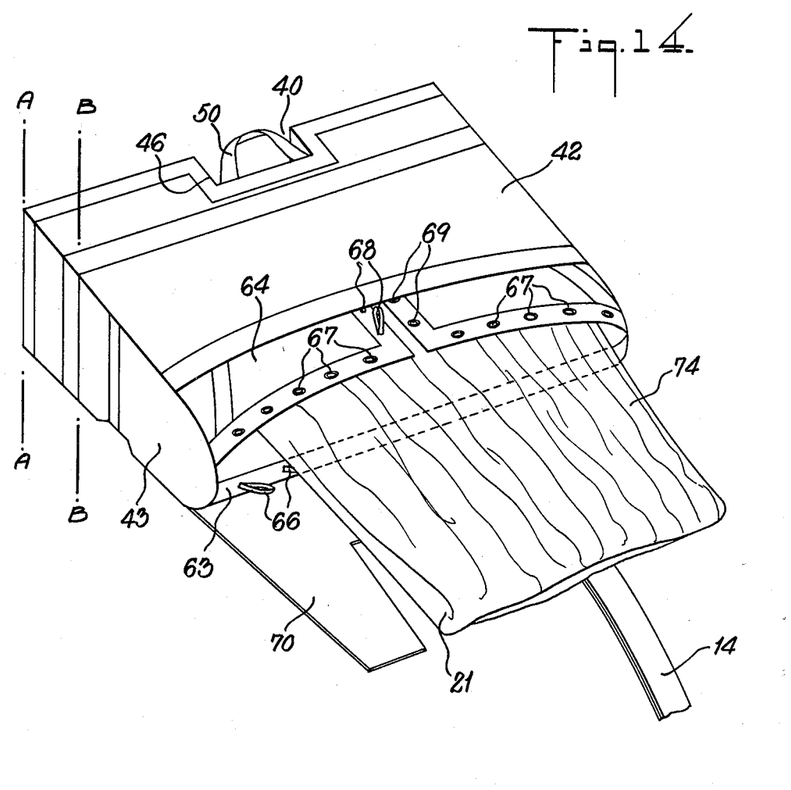
FIG. 14 is a perspective of the fully extended deployment bag after the canopy of the main drag parachute has been partially stowed in the bag.

The deployment bag 20, either before or after the riser 23 is threaded therethrough in the manner described, is reversely folded back to make the section of the stowage bag compartment 45 near the aft end of the bag easily accessible. FIGS. 14 and 19 show the aft end plane A of the fully extended deployment bag 20 and the plane B near the regions where the flaps 52, 53, 57 and 58 connect into the face bag panels 41 and 42, and FIG. 8 shows the deployment bag reversely folded back to the plane B to make the aft region of the stowage bag compartment 45 easily accessible.

Figure 9:
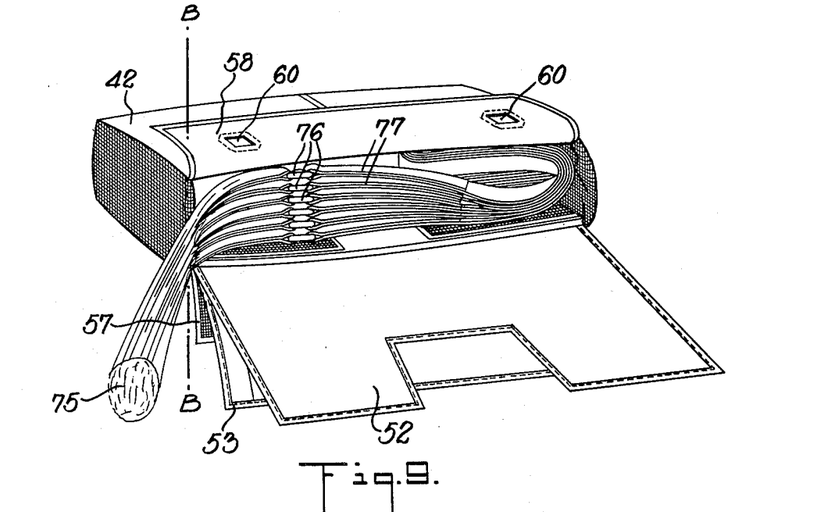
FIG. 9 shows a perspective of the reversely folded deployment bag at a later stage of packing after the risers have been stowed therein and before the suspension lines have begun to be stowed.

The bundle of riser legs 77 secured to the riser 23 inside the deployment bag 20 is accordion folded in one space 48 of the stowage compartment 45 to fill said space and then in the other space 48, as shown in FIGS. 8 and 9. The protector flap 52 is then folded over the folded riser legs 77, as shown in FIG. 10.

With the protector flaps 52 folded over the stowed riser legs 77, the suspension line stowage flap or tray 53 is extended and exposed and is made accessible. The flexibility of at least certain wall parts of the deployment bag 20, permitting said bag to be reversely folded back, makes it possible to render the stowage flap 53 easily accessible, as shown in FIG. 10.

Figure 10:
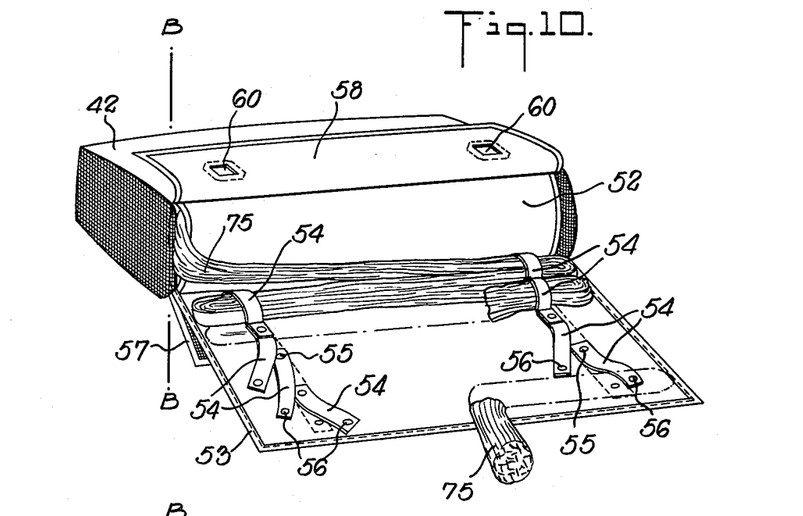
FIG. 10 shows a perspective of the reversely folded deployment bag at a still later stage of packing, while the suspension lines are being stowed on a stowage flap or tray.

The suspension lines 75 are accordion folded back and forth on the extended stowage flap 53, with each fold within the edges of the flap, and each fold is secured to the flap by snapping the fastener element 56 at the free end of the corresponding loop strap 54 to the fastener element 55 anchoring the next loop strap 54, as shown in FIG. 10.

Figure 11:
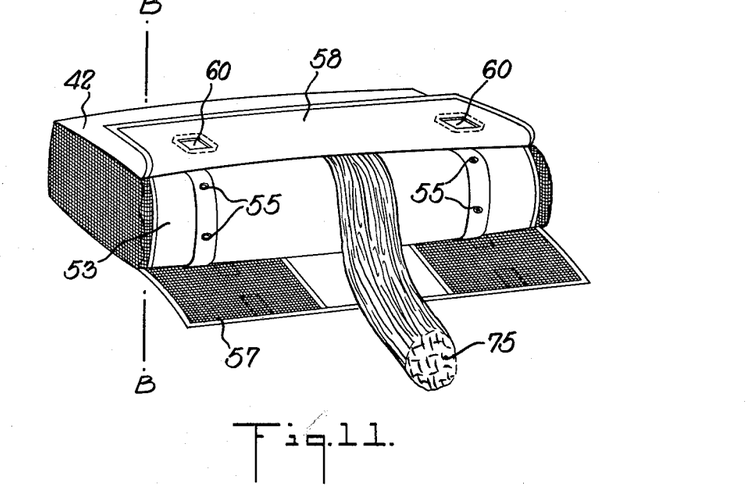
FIG. 11 shows a perspective of the reversely folded deployment bag at a subsequent stage of packing after the main sections of the suspension lines have been stowed on the stowage flap or tray and after this flap has been tucked into the bag but before the sections of the suspension lines closest to the canopy of the main parachute have been stowed.
Figure 12:
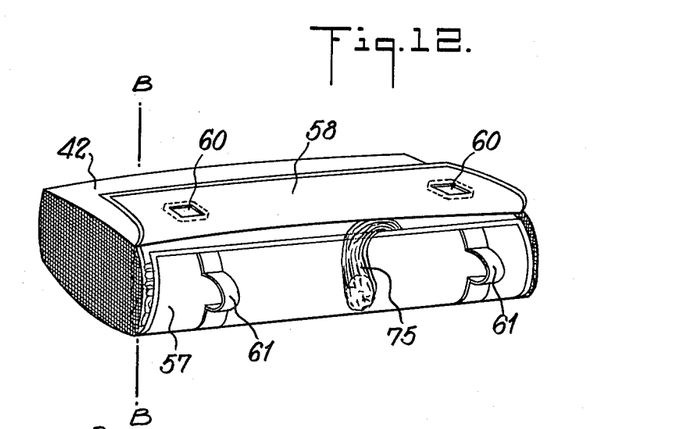
FIG. 12 is a perspective of the reversely folded deployment bag showing a later stage of packing after a lock flap with loops has been folded across the compartment of the bag.
Figure 13:
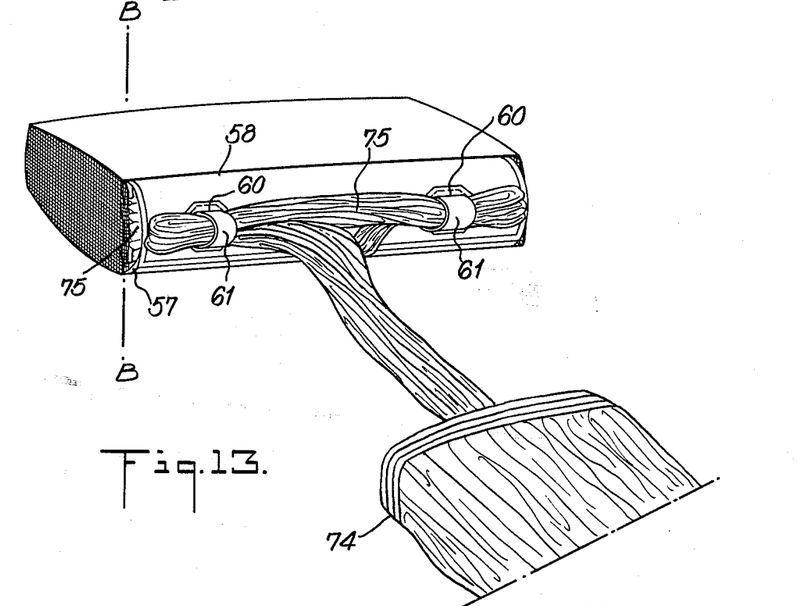
FIG. 13 is a perspective of the reversely folded deployment bag showing a later stage of packing after a lock flap with loop holes has been folded across the compartment of the bag and has been impaled upon the loops on the other lock flap, and after the sections of the suspension lines closest to the canopy of the main parachute have been stowed in the impaling loops.

With the stowage tray 53 completely filled with suspension lines 75, the tray is rolled into the stowage compartment 45, as shown in FIG. 11, with parts of the suspension lines closest to the canopy 74 of the main parachute 21 extending from the free side of the stowage tray 53. The lower locking flap 57 carrying the loops 61 is then folded up over the folded stowage tray 53 and the extending suspension lines are folded down over the folded flap 57, as shown in FIG. 12. The upper locking flap 58 is then folded down over the locking flap 57 and over the extending suspension lines 75, causing the loops 61 on the locking flaps 57 to pass through the holes 60 respectively on the locking flap 58, and to project outwardly beyond the upper locking flap 58. The extending suspension lines 75 emerging from underneath the free end of the upper locking flap 58 are then folded along the flap 58 and into the projecting sections of the loops 61 and between said loops, as shown in FIG. 13, to bolt the locking flaps 57 and 58 in locking position.

The locking flaps 57 and 58, interlocked through the bolting action of the first folded sections of the suspension lines 75 nearest the parachute canopy 74, lock in the risers and suspension lines in the bag compartment 45 behind said flaps, and permit these suspension lines and risers to be deployed only after said flaps have been released by the deployment of the first folded sections of the suspension lines 75 from the loops 60.

The parachute canopy 74 is next folded in the deployment bag 20. For that purpose, the bag 20 is fully extended from its previously reversely folded condition, as shown in FIG. 14, and the canopy is accordion-folded from side to side until the vent is positioned in the deployment bag. With the parachute canopy 74 entirely folded in the deployment bag 20, the two closure flaps 64 and 65 are drawn together and folded down over the parachute canopy 74 and to the anchorage strip 63, causing the loops 66 on said strip to pass through the matching grommets 67 and the series of loops 68 on the inner side margin of the closure flap 64 to pass through the matching grommets 69 on the inner side margin of the other closure flap 65.

Figure 16:
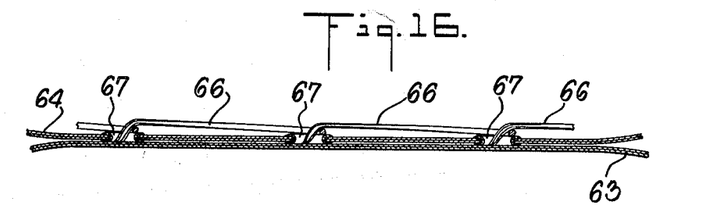
FIG. 16 is a section of the closure flaps taken on lines 16—16 of FIG. 15.

The process of loop-lacing the closure flaps 64 and 65 to the anchorage strip 63 is effected progressively from the outer sides of the flaps inwardly towards the center of the bag 20 by inserting through each loop 66 passing through the matching grommet 67, the next loop 66 nearest the center passing through its matching grommet 67, until the last loops 66a and 66b nearest the center have passed through the last matching grommets 67 in said flaps and through the next previous loops 66, as shown in FIGS. 15 and 16. The two closure flaps 64 and 65 are similarly loop-laced together on their inner confronting sides progressively from the aft end of the flaps to their free ends until the last loop 68a nearest the loops 66a and 66b, passing through the matching grommet 69 has been threaded through the next previous loop 68. The three loops 66a, 66b and 68a meeting in the center of the bag at the juncture 78 are tied together by a thread or cord 80, which is releasable either by making the knot firm and the thread frangible enough to break when the closure flaps 64 and 65 are subjected to the pulling action of the inflated pilot chute 18 or by tying the thread with a knot which is releasable in response to the pulling action of the inflated pilot chute. In the specific form shown, the knot tying the ends of the thread 80 together is a firm one, as for example, a combination surgeon and square knot, and the thread is frangible enough to break upon deployment action. Also, the pilot chute bridle 22 desirably has a tab 82, which is hand-tacked by a frangible thread or cord passing through the first grommet 67 in the center row of grommets, and having its ends tied together by a firm knot, as for example, a combination surgeon and square knot. This handtacking of the bridle 22 prevents accidental pulling of the stowed main parachute 21 from the bag compartment 45 and the release of the loop-lacing on the closure flaps 64 and 65 before deployment is in order.

If desired, the extra cord for handtacking the pilot chute bridle 22 may be dispensed with and the tab 82 on said bridle may be connected to the loops 66a, 66b and 68a through the cord 80, so that the tugging of the bridle breaks the cord.

Upon release of the tying thread or cord 80 in the manner described, the loop-lacing will unravel and the closure flaps 64 and 65 will open up progressively from the center of the deployment bag 20 towards the outer sides of the bag and the closure flaps will separate progressively from the loop juncture 78 progressively towards the aft end of the bag, thereby opening the deployment bag 20 and permitting the main parachute 21 to be deployed therefrom.

Figures 16, 17:
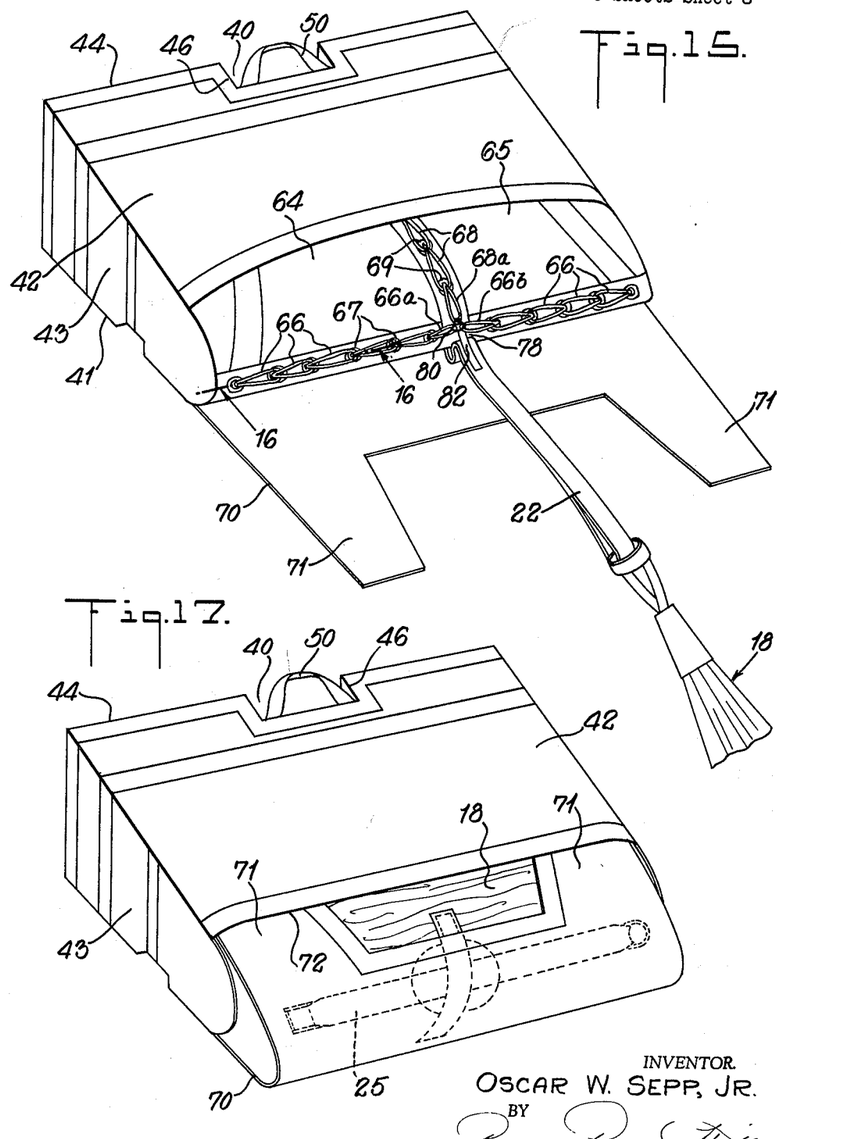
FIG. 17 is a perspective of the fully extended deployment bag shown fully packed and after the pilot chute has been temporarily housed between the closure flap and an outer aft flap.

Before the pack described is set up in the stowage chamber 12 of the aircraft with the spring device 25 in loaded ready state, the pilot chute 18 is temporarily stowed on the deployment bag 20. For that purpose, the entire pilot chute 18 is accordion folded over the aft flap 70 and the flap is then folded over the aft end of the bag with the legs 71 thereon tucked into the pocket 72, as shown in FIGS. 17 and 18.

When it is desired to set up the pack in loaded ready state in the stowage chamber 12 of the aircraft 10, the packed deployment bag 20 is placed in the chamber and the main parachute riser 23 projecting from the forward end thereof is anchored to the aircraft 10 at 24. The pilot chute 18 is then set up on top of the deployment bag 20, the spring device 25 is tensioned and latched onto the catches 30 and 31 on the door 13 while the door is partially closed and the aft flap 70 is folded over the bag with the pilot chute bridle 22 passing through the opening between the legs 71 and with these legs folded over the deployment bag 20 or tucked into the pocket 72, as shown in FIGS. 3 and 4. With the pack so set up, the door 13 is latched down in closed position.

When the aircraft lands on a runway, the pilot releases the latch 15 causing the door 13 to open by spring or hydraulic action. This releases the spring device 25 and ejects the pilot chute 18 from the deployment bag 20. The deployment of the pilot chute 18 pulls the aft flap 70 over the aft end of the doorway and over the latch member 16, so that the edge of the fuselage framing the aft end of the doorway and the latch member are covered, as shown in dot and dash lines in FIGS. 2 and 3. During the subsequent deployment of the main parachute 21, this parachute cannot catch onto this frame edge or latch member 16 because of the blanketing presence of the aft flap 70.

During the full course of deployment of the main drag parachute 21, the deployment bag 20 remains in the stowage chamber 12 of the aircraft anchored to the aircraft, so that the bag is not injured or unduly worn by being dragged along the runway and orderly deployment is assured because the bag is held in predetermined position in the aircraft during deployment.

While the invention has been described with particular reference to a specific embodiment, it is to be understood that it is not to be limited thereto but is to be construed broadly and restricted solely by the scope of the appended claims.

What is claimed is:

1. A parachute deployment bag having face walls, side walls and a wall at one end, said walls conjointly defining a stowage compartment, and closure flap means for closing the other end of said bag, comprising a closure flap connected to one of said face walls and an anchorage strip connected to the other face wall, said closure flap being adapted to be folded across said compartment to said anchorage strip to close said compartment, loops secured to said anchorage strip and spaced therealong, said closure flap having eyelets spaced therealong and matching said loops to permit said loops to pass through said eyelets respectively when said closure flap is folded to said anchorage strip, each of said loops being long enough to permit the next loop to pass therethrough for progressive releasable interlacing of the loops.

2. A parachute deployment bag having face walls, side walls and a wall at one end, said walls conjointly defining a stowage compartment, and closure flap means for closing the other end of said bag comprising a pair of closure flaps located side by side across the bag with their confronting edges extending close together along the length of the bag and secured along one edge to one of said face walls in a direction extending between said side walls, said closure flaps being adapted to be folded across said bag to the other face wall, an anchorage strip secured to the other face wall in a direction extending between said side walls, said closure flaps in folded position extending to said anchorage strip, a series of loops secured to said strip and spaced therealong, said closure flaps having a series of grommets along their outer free edges matching said loops, one of said closure flaps having a series of loops spaced along its confronting edge and the other closure flap having a series of grommets spaced along its confronting edge matching the latter loops respectively, said loops being long enough to permit them to pass through their matching loops respectively and to permit the next loop to pass therethrough, whereby said loops and grommets may be progressively interlaced from the sides of the bag inwardly towards a juncture near said confronting edges and along said confronting edges towards said juncture, and means for stowing a parachute in said bag in orderly position for deployment from said other end of the bag.

3. A parachute deployment bag having a pair of opposite face walls, a pair of opposite side walls, and a wall at one end, the other end being openable, said walls conjointly defining a stowage compartment, a suspension line stowage flap in the form of a tray secured to the inside of one of said face walls along an edge of said flap extending between said side walls and stretching from its secured edge towards the openable end of said bag, said stowage flap carrying two rows of loop straps at opposite sides respectively of the flap for releasably folding the folds of the suspension lines, said flap being foldable when the suspension lines are stowed thereon towards the other face wall, said bag being flexible enough to permit said bag to be partially reversed inside out to a region near the securement edge of said flap to render said flap easily accessible for stowage, and a pair of foldable locking flaps connected to the inside of opposite walls respectively of said pair of walls, and located in position to be folded against the outer side of said suspension line stowage flap in folded position of the latter flap, said locking flaps being long enough to overlap in folded position, one of said locking flaps having a pair of loops and the other having a pair of holes through which said loops extend respectively in overlapping positions of said locking flaps, the loops passing through said holes being adapted to receive folds of parachute suspension lines to stow some of said suspension lines and at the same time to releasably lock said locking flaps in overlapping relationship.

4. A parachute deployment bag having face walls, side walls and a wall at one end, said walls conjointly defining a stowage compartment, closure flap means for closing the other end of said bag having lacing means for releasably holding said flap means in closure position, said lacing means including means for causing progressive unravelment thereof upon the release of a part of said lacing means, said closure flap means including a closure flap member and an anchorage flap member, said lacing means including a series of loops carried by one of said members and a series of eyelets carried on the other member matching said loops, said loops being adapted to pass through said eyelets respectively when said flap member is folded across said compartment and is joined to said anchorage member, each of said loops being long enough to permit the next loop to pass therethrough for progressive releasable interlacing of the loops, and means for stowing a parachute in said compartment in orderly position for deployment.

References Cited by the Examiner

UNITED STATES PATENTS

| 1,354,225 | 9/20 | Smith | 244—147 |
| 2,687,263 | 8/54 | Frieder et al. | 244—148 |
| 2,940,703 | 6/60 | Lent | 244—147 |

FOREIGN PATENTS

| 967,712 | 4/50 | France. |
| 1,193,218 | 4/59 | France. |

MILTON BUCHLER, *Primary Examiner.*

ANDREW H. FARRELL, *Examiner.*